UNITED STATES PATENT OFFICE.

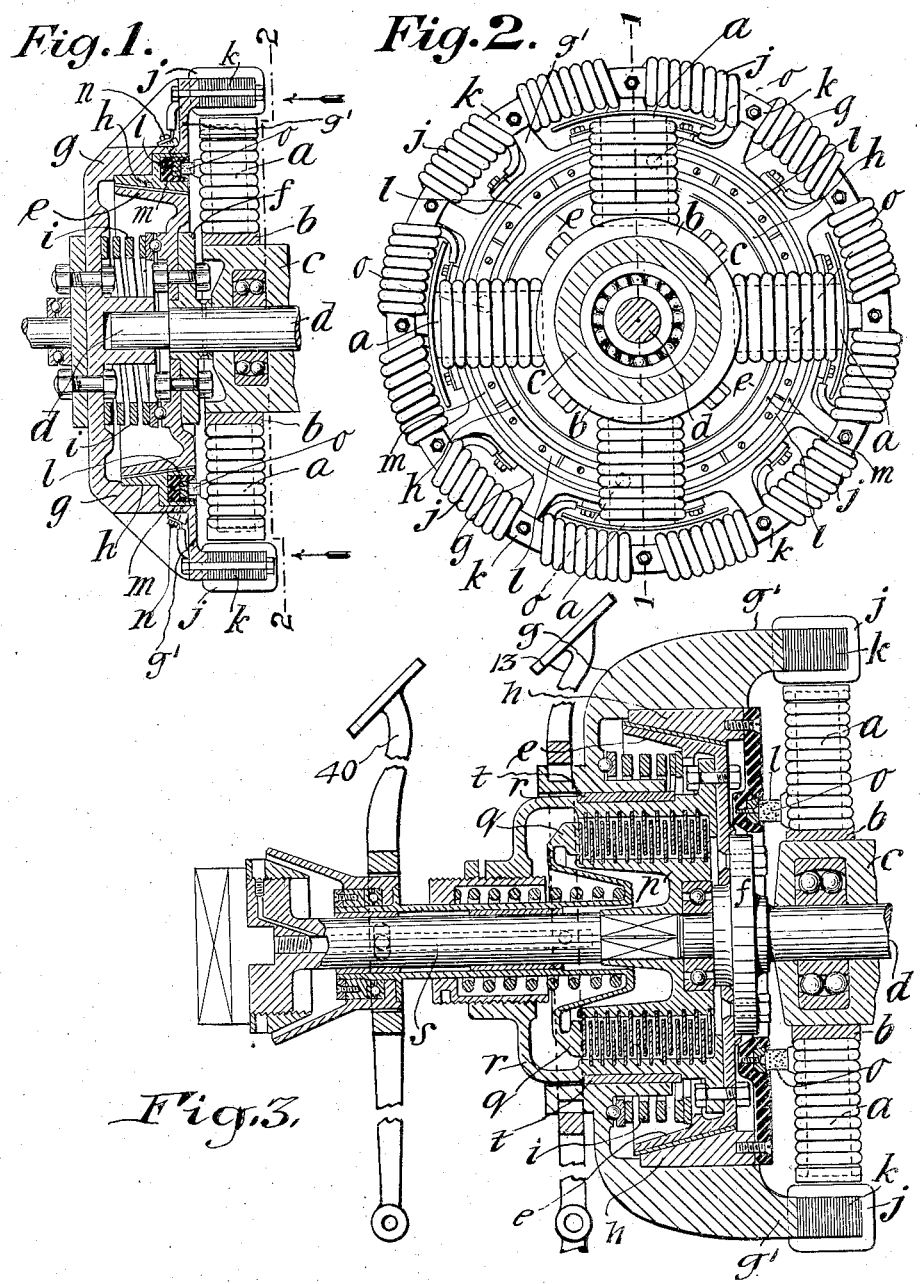

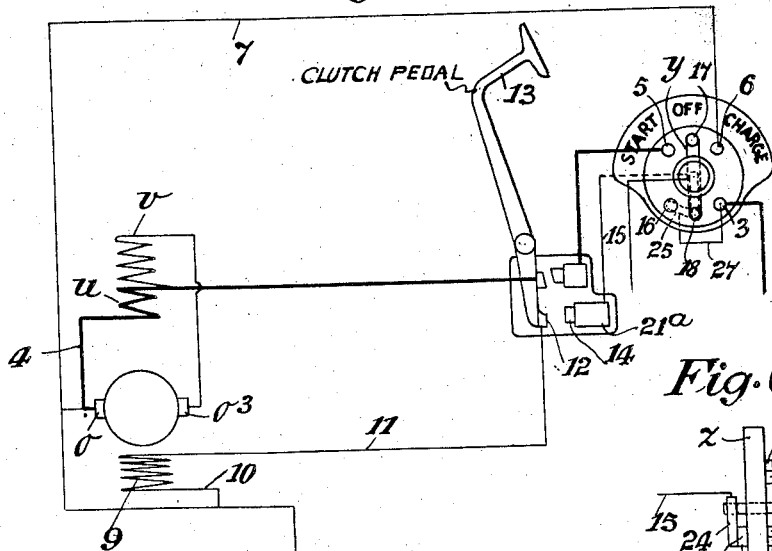
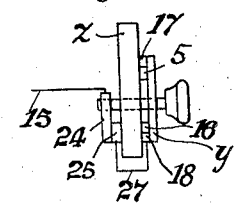
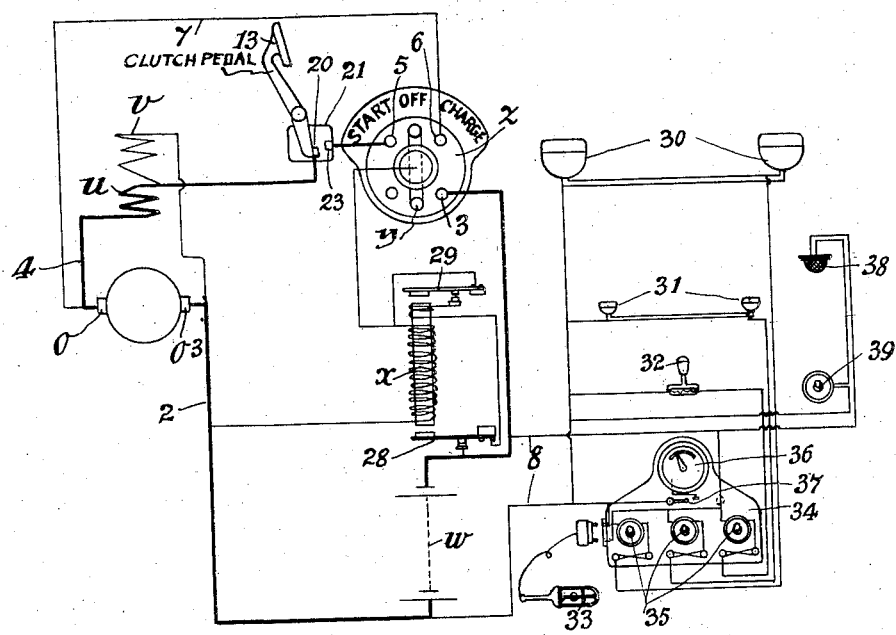

FREDERIC H. BOWMAN, OF MANCHESTER, AND RALPH L. ASPDEN, OF CHORLEY, ENGLAND; SAID BOWMAN ASSIGNOR OF HIS ENTIRE RIGHT TO RICHARD EDWARD ASPDEN, OF CHORLEY, ENGLAND.

ELECTRICAL EQUIPMENT OF MOTOR VEHICLES AND AIRCRAFT.

1,419,607.   Specification of Letters Patent.   Patented June 13, 1922.

Application filed August 28, 1920. Serial No. 406,696.

*To all whom it may concern:*

Be it known that we, FREDERIC HUNGERFORD BOWMAN, a British subject, residing at Manchester, in the county of Lancaster, England, and RALPH LEONARD ASPDEN, a British subject, residing at Chorley, in the county of Lancaster, England, have invented certain new and useful Improvements in the Electrical Equipments of Motor Vehicles and Aircraft, of which the following is a specification.

This invention relates to the electrical equipment of motor vehicles and aircraft.

The main object of our invention is to reduce the weight of and simplify the electrical equipment of motor vehicles and aircraft and their auxiliary apparatus without affecting the flexibility of the engine in running.

Our invention consists in substituting for the usual fly wheel of the engine, the rotary portion of a dynamo-electric machine which is adapted to be clutched to and declutched from the engine shaft by means of a clutch one member of which is positively connected to the engine shaft, and in arranging the stationary portion of said machine in such a manner that the two portions can co-operate to produce a current of electricity when the engine is running which can be employed for ignition and lighting purposes.

The invention consists further in forming the dynamo-electric machine to also run as a motor in circuit with an accumulator and in providing in said circuit a switch which is automatically-closed by declutching said rotary portion and opened by clutching in said rotary portion, whereby the dynamo-electric machine can be employed as an engine starter and the rotary portion of the same can be allowed to run idly and attain a high speed before it is clutched to the engine shaft by said clutch to perform the starting operation.

By this means, the momentum of the rotary portion of the machine may be utilized to turn the engine shaft and the size of the accumulator required for that purpose is reduced to a minimum.

The invention further consists in forming the dynamo-electric machine to also act as a magnetic brake in an auxiliary circuit with said accumulator and in providing in the auxiliary circuit a switch which is automatically closed by continued movement of the movable member of the clutch after said member has been disengaged and, by reverse movement of said member is opened before the clutch is engaged.

The dynamo-electric machine can therefore be employed in place of the usual clutch brake and vehicle brakes, and acts more gently and sweetly than such brakes.

Where it is not desired to employ the dynamo-electric machine as a magnetic brake and it is desired to employ the hereinbefore named clutch for starting purposes only, we may rotatably mount the rotary portion of the dynamo-electric machine on one member of a second clutch connected to the engine shaft, another member of the second clutch being mounted on the gear box or transmission shaft. This construction enables the transmission from the engine to the road wheels to be arranged and controlled independently of the above described means, and enables the rotary portion of the dynamo-electric machine to act as a fly wheel at all times.

The second clutch is employed for all usual purposes of gear changing or the like, the first clutch being normally in engagement, and being only thrown out when the annular member is run idly before starting the engine.

It is immaterial to the action of the dynamo-electric machine whether the second clutch is engaged or disengaged during the starting operation.

We attain the hereinbefore recited objects by the apparatus illustrated in the annexed two sheets of drawings wherein:—

Figure 1 is a view of the dynamo-electric machine in vertical section on line 1—1 of Figure 2.

Figure 2 is a vertical section on line 2—2 of Figure 1 regarded in the direction of the arrows.

Figure 3 is a view in vertical section through the axis of the dynamo-electric machine design in which a second clutch is embodied.

Figure 4 is a diagram illustrating the electrical wiring and so forth for the machine illustrated in Figure 3.

Figure 5 is a diagram illustrating a modification in the wiring which may be employed in connection with the machine shown in Figures 1 and 2.

Figure 6 is a side view of a detail of Figure 5.

Like references refer to similar parts throughout the various figures.

In the construction illustrated in Figures 1 and 2 a stationary magnetic field, preferably comprising a number of wound poles $a$, mounted on a collar $b$ is provided on the crank case of the engine, preferably on a boss $c$ at the end of the engine, (not shown) where the fly wheel is usually situated. To the engine shaft $d$, in place of the usual fly wheel we secure the interior member $e$ of a cone clutch by bolting it to a collar $f$ secured to the shaft $d$ and we loosely mount on the end of the shaft $d$, an annular member $g$ carrying an outer cone clutch member $h$. A compression spring $i$ is situated between the clutch members and the conicity of the members $e$ and $h$ is such that when loosely mounted member $g$ is pressed towards the fixed member $e$ against the action of the spring $i$, the clutch surfaces become separated whilst movement of the loose member $g$ away from the fixed member $e$ by the action of the spring $i$, causes the clutch surfaces to come into frictional contact.

The annular member $g$ is provided with windings $j$ in the plane of the stationary poles $a$ and for this purpose we may secure to the member $g$ a number of thin annular rings $k$ forming together a laminated gramme ring upon which the gramme winding $j$ is provided. The annular member $h$ carries a suitable number of commutator segments $l$ which are suitably insulated from the member $h$ and one another by insulation $m$ and are connected to the gramme winding $j$ by means of binding screws $n$. The stationary magnetic field is provided with spring holders containing collecting brushes $o$, preferably of carbon, which yieldingly bear against the commutator formed by the segments $l$. When the member $g$ is moved axially to disconnect the clutch elements $e$ and $h$, the brushes $o$ are retained in operative contact with the commutator segments $l$ by the action of compressed springs (not shown) which yieldingly support the brushes.

In the example illustrated by Figure 3, the construction of the dynamo-electric machine is similar to that described with reference to Figures 1 and 2, the commutator however being situated nearer the axis of rotation and the member $e$ of the two clutch members $e$ and $h$ being secured to a collar $f$ formed integral with the engine shaft $d$. In addition to the clutch $e$, $h$, we employ another clutch shown by way of example only as plate clutch the parts $p$, $q$ and $r$ thereof being mounted on the engine shaft $d$ and gear box or transmission shaft $s$ in the well known manner. The part $r$ however is bolted to the clutch member $e$.

On the exterior of the part $r$ of the clutch which is situated on the gear box shaft or annular transmission shaft, we provide an annular bearing surface $t$, preferably of white metal, and we mount the annular member $g$ rotatable on said bearing $t$. In lieu of the bearing surface $t$ we may provide a ball bearing between the part $r$ and the part $g$.

In the construction shown in Figures 1 and 2 the clutch member $e$ may be of heavy construction for the purpose, in engines having a small number of cylinders, of acting as a fly wheel at such times as the member $g$ is declutched from the engine shaft.

In the wiring shown in Figure 4, a series winding $u$ and a shunt winding $v$ are provided connected to the collecting brushes $o$, $o^3$, one of which is connected to one terminal of an accumulator battery $w$ by the lead 2 the other terminal of which battery is connected through an automatic cut in and out and overload cut-out $x$ to the switch lever $y$ of a two way switch $z$ and direct to the switch contact 3.

The one end of the series field winding $u$ is connected to the collector brush $o$ by the lead 4 and the second end of the winding U is connected to a contact 20 of an oil switch 21. The contact 20 is mounted on and moves with the clutch pedal 13 provided for operating the clutch member $h$ (Figures 1 and 2, or Figure 3). The other contact 23 of the switch 21 is connected to the switch contact 5, this contact and the contact 3 being so arranged that they can be closed by the switch lever $y$. The brush $o$ is connected to the contact 6 on the switch $z$ by the lead 7. The switch is so arranged that the lever $y$ has a central neutral position. The lighting and ignition current is taken direct from the accumulator battery by the leads 8 and is controlled by any suitable arrangement of switch apparatus, one arrangement being shown by way of example. The oil switch 21 is so arranged that contact does not take place therein until the clutch has been depressed so far as to cause the clutch members $e$ and $h$ to slip.

The hereinbefore described device operates as follows:—

Assuming the car to be stationary, the engine to be stopped, the accumulator to be charged and the gears in neutral position, for the purpose of starting the engine, the clutch members $e$, $h$ are declutched by means of the pedal 13, whereby the switch 21 is closed, and the switch lever y is moved from its neutral position into a position where it closes the contacts 3 and 5 and thereby connects the acumulator with the series field winding u. The current taken from the accumulator then causes the annular member g to rotate idly and attain a high velocity, the starting torque being very large owing to the current passing through both the series and shunt winding u and v. When the annular member g attains a suitable speed, the clutch members e and h are allowed to engage, the switch 21 being thereby opened to break the circuit, and the engine shaft d is rotated by the momentum of the member g and starts the engine. The switch lever y is then moved into its neutral position, or it is moved over into its second position where it closes the contact 6 and connects the accumulator battery through the automatic cut in or out and overload cut out x direct with the collector brushes $o^3$ $o'$, and the current generated in the gramme winding j thereby serves to charge the accumulator battery w, the shunt circuit winding v coming automatically into action for this purpose. In the neutral and second position of the switch, the annular member g acts as a fly wheel. For facilitating construction the annular member g may be formed with a number of arms g', to which the gramme ring is secured at spaced distances, or the gramme ring core may be formed solid and integral with the annular member. The outer clutch member h is preferably formed separately from and forced into the annular member g, and is also preferably arranged to carry the commutator segments l which may be bedded in a channel section, annular insulating ring m fitting in an annular groove in the side face of the outer clutch member h, see Figures 1 and 2.

In lieu of arranging the commutator as hereinbefore described it may be arranged on the outer side of the annular member in proximity to the shaft to which it is secured which is preferably the gear box shaft, and the collector brushes may then be carried by suitable arms and framing extending from the crank casing over the outer periphery of the annular member to the opposite or far side thereof.

The clutch e, h, in both the construction illustrated in Figures 1 and 2 and the construction illustrated in Figure 3, is operated by the clutch pedal 13. The clutch e, h as arranged in the construction illustrated in Figures 1 and 2 serves for all the usual purposes of gear changing, starting and stopping the vehicle and so forth in addition to serving for engine starting purposes and the pedal 13 operating the same can therefore take the place of the usual clutch pedal. In the construction illustrated in Figure 3, the clutch e, h operated by the pedal 13 serves only for engine starting purposes and another clutch pedal 40, which may be the usual clutch pedal, is connected to the member q to operate the clutch p, q and r for the purpose of changing gear, and stopping and starting the vehicle.

In order to facilitate the changing of gears and enable the dynamo-electric machine to be employed as a vehicle brake, in connection with the construction shown in Figures 1 and 2, we may employ a modification in the wiring of the machine and its electrical connections, such a modification being illustrated by way of example in Figure 5. In this figure field windings 9 are provided and are direct connected at one end to one pole of the accumulator battery by the lead 10. These windings may be connected to the armature brushes or they may operate entirely independently therefrom. Furthermore these windings are wound in opposite direction to the winding u, or they may be wound in the same direction and oppositely connected to the battery w. The other end of the windings is connected by lead 11 to a contact 12 moving with but insulated from the clutch pedal 13 which operates the clutch e, h (Figures 1 and 2). A yielding contact 14 is provided in such a position that on further depression of the clutch pedal 13 after disengagement of the clutch member h, the contacts 12 and 14 are closed. As in Figure 4, the windings u are connected to the contact 20 which moves with but is insulated from the clutch pedal 13 and is adapted to contact with 23 before contact takes place between 12 and 14. All these contacts are arranged in an oil bath $21^a$. The contact 14 is connected by a lead 15 to an arm 24 secured to but insulated from the spindle 26 of the switch z, Figure 6. The arm y is also secured to but insulated from the spindle 26. A segmental contact 25 is provided for the arm 24 to slide on and is connected to the contact 3 by a lead 27. The windings 9 are therefore in an auxiliary circuit the current of which acts in reverse direction to that of the main circuit. This auxiliary circuit is under the control of the switch lever y and the clutch pedal 13. The remainder of the wiring is as shown in Figure 4.

In operation, starting the engine is effected as hereinbefore described, and movement of the switch lever y to the "start" position breaks the auxiliary circuit by causing the arm 24 to leave the contact 25. When the switch lever y has been moved into its "charge" or "off" position, the arm 24 has again come into contact with the contact 25 and the auxiliary dircuit is closed at that point. This circuit however remains open at 12, 14 until the clutch e, h has been declutched by means of the pedal 13. Therefore on depression of the pedal 13 for gen changing purposes when the vehicle is moving, the auxiliary circuit does not come into action unless it is desired. When it is desired to brake the clutch, either when the vehicle is standing or moving, further depression of the pedal 13 after it has been moved sufficiently to disengage the clutch, closes the auxiliary circuit and causes a current to flow in reverse direction through the dynamo-electric machine with the result that the latter acts as a brake on the clutch member. It will be observed that owing to a break in the main circuit at the switch $z$ closure of the contacts 20 and 23 does not affect the operation of the dynamo-electric machine as a magnetic brake.

If the change gears are left in mesh, the vehicle may be braked by actuating the pedal 13 to disengage the clutch and make contact between 12 and 14. The dynamo-electric machine then performs the same operation as the mechanical brakes now employed, but in a sweeter and more efficient manner.

It will be appreciated that the above described devices serve as and therefore takes the place of the usual fly wheel, self-starter, ignition current generator and lighting current generator and also in some cases, of the clutch and vehicle brakes.

Although we have described specific forms of clutches, windings, switches and connections, it is to be understood that we may employ any other suitable form thereof.

The automatic cut in and out $x$ serves also as an overload cut out, the lower spring 28 of the switch being much stronger than the spring 29 thereof and being therefore not attracted to break circuit until too much current is flowing for the supply of the battery.

The larger winding of the switch $x$ is in shunt with the brushes $o$ and $o^3$ and therefore supplies the greater part of the magnetism necessary to attract the spring 28. The battery charging current flows only through the smaller winding of the switch $x$ and therefore cessation of said current when the charging current is broken by attraction of the spring 28, does not reduce the magnetism acting on the spring 28 sufficiently to allow said spring to move from its attracted position, as the magnetism in the larger coil increases with the speed of the dynamo-electric machine and the voltage of the current passing through the larger winding is increased.

The battery and dynamo-electric machine may supply any suitable ignition system (not shown) and any suitable lighting system. In the lighting system illustrated in Figure 4, there are 2 head lamps 30, 2 side lamps 31, a tail lamp 32 and a dash lamp 33. All these lamps are connected in parallel and the leads brought down to the switch board 34 which contains 3 ordinary tumbler switches 35 for controlling the lamps. The voltmeter 36 is provided on the switch board 34 and the condition of the battery W, can be ascertained by pressing the key 37 arranged below the voltmeter. The roof lamp is connected direct to the battery W, independently of the switch board and is provided with its own switch 39.

We claim:—

1. In the electrical equipment of a power propelled carrier, an internal combustion engine; an engine shaft forming an element thereof; a dynamo-electric machine rotatably and slidably mounted on the engine shaft in place of a fly wheel; clutch means on the dynamo electric machine rotor; clutch means rigidly provided on the engine shaft; means connected on the dynamo-electric machine rotor adapted to be operated to slide said rotor on the engine shaft and thereby clutch and declutch said rotor to and from the clutch member rigid with the engine shaft; and a dynamo-electric machine stator provided on a fixed part of the motor vehicle or aircraft adapted to cooperate with the dynamo-electric machine rotor and produce therewith an electrical current when the internal combustion engine is running; for the hereinbefore specified purpose.

2. In the electrical equipment of a power propelled carrier, an internal combustion engine; an engine shaft forming an element thereof; a dynamo-electric machine rotor mounted on the engine shaft; clutch members between the dynamo-electric machine rotor and the engine shaft; a dynamo-electric machine stator fixed in cooperative position in relation to the rotor; electric windings on the dynamo-electric machine; an accumulator connected to said windings; a switch actuated by the clutching and declutching of said clutch members; brake windings provided on the dynamo-electric machine and in an auxiliary circuit with the accumulator; and a switch operated by actuation of the clutch members to automatically close the auxiliary circuit and excite the brake windings on disengagement of the clutch members and to automatically break the auxiliary circuit before the clutch members arrive in engagement; for the hereinbefore specified purpose.

3. In the electrical equipment of a power propelled carrier, an internal combustion engine; an engine shaft forming a part thereof; a dynamo electric machine the rotor of which is rotatably and slidably mounted in alignment with the shaft and the stator of which is fixed in cooperative relation therewith; a clutch between the rotor and the engine shaft for engaging and disengaging the rotor with the engine shaft for starting purposes; a transmission shaft for transmitting the motion of the engine; and an independently operable second clutch between the engine shaft and the transmission shaft for direct engagement and disengagement of the transmission shaft with the engine shaft independently of the first named clutch for gear charging and the like purposes.

4. In the electric equipment of a power propelled carrier, an internal combustion engine; an engine shaft forming an element thereof; a dynamo-electric machine rotor mounted on the engine shaft; clutch members between the dynamo electric machine and the engine shaft; a dynamo electric machine stator fixed in cooperative position in relation to the rotor; an accumulator connected to the terminals of the dynamo-electric machine; a three position switch controlling the connections between the accumulator and the dynamo-electric machine to cause the machine to run as a dynamo in its first position of the switch, break the connections in its second position, and to cause the machine to run as a motor in its third position; brake windings on the dynamo-electric machine connected to the accumulator by an auxiliary circuit; a switch in the auxiliary circuit mechanically connected to the first named switch and adapted by movement of said switch into its second position to automatically close the auxiliary circuit and excite the brake windings.

5. In the electric equipment of a motor vehicle or aircraft, an internal combustion engine; an engine shaft forming an element thereof; a dynamo-motor winding provided on a part of the engine casing; a member rotatably mounted on the engine shaft; a dynamo-motor winding on said member; a rotary member rigid with the engine shaft and rotary means axially slidable but non-rotatable relative to the engine shaft adapted to couple or uncouple the first and second named members at will.

6. In the electrical equipment of a motor propelled carrier, a crank casing; a crank shaft projecting therefrom; a stator of an electro-magnetic machine fixed to the crank casing; one member of a friction clutch all portions of which are rigid with the crank shaft; a rotor of an electro-magnetic machine rotatably mounted in alignment with the crank shaft and slidable relative to crank shaft; and another member of a friction clutch provided on the rotor and adapted to cooperate with the first named member and be declutched therefrom by a sliding movement of the rotor in one direction.

7. In the drive of a dynamo-electric machine by an internal combustion engine of a power propelled carrier, an armature freely mounted on the engine shaft, a member rigid with the engine shaft; two clutch elements carried by said member; a transmission shaft; a third clutch element slidably mounted on the transmission shaft and cooperating with one of the first named clutch elements; a fourth clutch element rigidly mounted on the armature member; two of said clutch elements being slidable relatively to the other elements to couple and uncouple the transmission shaft and armature to and from the engine shaft at will.

Signed at Manchester, in the county of Lancaster, England this 16th day of August, 1920.

FRED<sup>c</sup>. H. BOWMAN.
RALPH L. ASPDEN.

Witnesses:
MARY I. BOSSHARDT,
F. B. BOSSHARDT.